United States Patent [19]

Nicolas et al.

[11] Patent Number: 5,181,054
[45] Date of Patent: Jan. 19, 1993

[54] DEVICE FOR THE PROJECTION OF IMAGES USING TWO ORTHOGONAL COMPONENTS OF LIGHT POLARIZATION

[75] Inventors: Christophe Nicolas, Paris; Brigitte Loiseaux, Villebon S/Yvette; Jean-Pierre Huignard, Paris; Claude Puech, Ballainvilliers, all of France

[73] Assignee: Thomson-CSF, Puteaux, France

[21] Appl. No.: 739,488

[22] Filed: Aug. 2, 1991

[30] Foreign Application Priority Data

Aug. 10, 1990 [FR] France .................. 90 10251

[51] Int. Cl.⁵ .............................. G02F 1/13
[52] U.S. Cl. .................. 353/20; 353/31; 353/37
[58] Field of Search .......... 353/20, 31, 33, 34, 353/37, 81, 94; 359/629, 630, 634, 618, 40

[56] References Cited

U.S. PATENT DOCUMENTS

| | | |
|---|---|---|
| 2,449,287 | 9/1948 | Flood . |
| 5,028,121 | 7/1991 | Baur et al. .............. 353/31 |
| 5,042,921 | 8/1991 | Sato et al. .............. 359/49 |
| 5,073,013 | 12/1991 | Sonehara et al. ........ 353/31 |
| 5,075,798 | 12/1991 | Sonehara et al. ........ 353/31 |
| 5,097,323 | 3/1992 | Sato et al. .............. 353/34 |

FOREIGN PATENT DOCUMENTS 83090 7/1983 European Pat. Off. .
361559 4/1990 European Pat. Off. .
364039 4/1990 European Pat. Off. .

OTHER PUBLICATIONS

"Van Norstrand's Scientific Encyclopedia" Edition 7, vol. 2, 1989, New York, US, D. M. Considine et al. p. 1719.

Primary Examiner—William A. Cuchlinski, Jr.
Assistant Examiner—William C. Dowling
Attorney, Agent, or Firm—Oblon, Spivak, McClelland, Maier & Neustadt

[57] ABSTRACT

Disclosed is an image projector in which a spatial modulation of light is carried out on the two orthogonal components of polarization of light in order to increase the luminous efficiency of the projector. The image projector of the invention includes a light source, a projection screen, a splitter of polarizations splitting the light into two polarized beams having complementary polarizations, two mirrors reflecting the two polarized beams, firstly so as to give them opposite directions and superimpose them on one and the same axis on which a spatial light modulator is positioned and, secondly, to make them pass again through the polarization splitter by which they are superimposed on one and the same axis with one and the same direction and oriented towards the projection screen and/or the light source as a function of their modulation by the spatial modulator.

19 Claims, 10 Drawing Sheets

DEVICE FOR THE PROJECTION OF IMAGES USING TWO ORTHOGONAL COMPONENTS OF LIGHT POLARIZATION

BACKGROUND OF THE INVENTION

1. Field of the Invention

The invention relates to a projection device enabling the formation of an image on a distant screen with a high luminous efficiency, through the use of the two orthogonal components of light polarization.

2. Description of the Prior Art

In image projectors, the image projected on a screen results from a spatial modulation of light. The light produced by a source is guided up to a set of light modulators marshalling the means needed to achieve the spatial modulation of light. It is common to use a liquid crystal display (LCD) screen as a spatial light modulator. This LCD screen has a matrix array of elementary liquid crystal cells, controlled by means of a video signal. Each cell represents an elementary dot of the image. The LCD is also called an optical valve or, again, an "electronic slide".

Liquid crystal cells are generally of the twisted nematic type with 90° helix. These liquid crystal cells are the best known ones, and are generally used in thin film transistor technology enabling them to be addressed by a video signal. This means that each cell is controlled by means of a switching element or TFT (thin film transistor).

In the resting state, each elementary cell of the LCD has a capacity of rotation (by 90°) in two orthogonal directions of polarization of the light that goes through it. When an elementary cell is activated, i.e. when the electrical field applied to a cell increases, under the effect of the video signal for example, the rotational capacity gradually disappears. Rotational angles of 0° to 90° may be obtained by causing a continuous variation in the signal applied to the "TFT", i.e. to the elementary liquid crystal cell.

On the basis of this principle, the working of a standard image projector using a spatial modulator such as an LCD requires the selection of a direction of polarization for the illumination of the LCD screen, so that the complementary polarization is not used. To preserve only one direction of polarization, the light goes through a polarizer before illuminating the LCD screen.

After passing through the LCD screen, the light may again have two complementary types of polarization according to a spatial distribution that depends on the cells and on the degree of their activation. The display of the state of each cell of the LCD screen is obtained by making the light that emerges from the LCD screen pass through a means for the analysis of polarization, a polarizer for example.

The method explained here above is the one most commonly used, because it is the one that is least complicated to implement. However, it has the major drawback of leading to a low luminous efficiency. Indeed, the removal of one of the components of light with a given polarization directly leads to the loss of at least 50% of the light energy, plus the absorption by the polarizer and the analyzer of the light having the useful polarization direction.

SUMMARY OF THE INVENTION

The invention relates to light polarizers and, more particularly, to light modulation sets.

The invention proposes an increase in the luminous efficiency through the use of the two complementary components of polarization, through a means giving light energy gain by a factor of at least two, or even practically a factor of three. It further proposes an arrangement of the light modulation sets that can be used, notably, to form a highly compact color projector.

According to the invention, there is proposed an image projector comprising at least one light source, at least one light modulation set, a projection objective, the light modulation set comprising at least one spatial modulator of light, at least one polarization splitter that splits the light into a first polarized beam and a second polarized beam having different directions, and different and complementary polarizations, wherein the light modulation set has means to superimpose the first and second polarized beams on one and the same optical axis with opposite directions of propagation, the spatial modulator of light being positioned on said optical axis in order to modulate the first and second polarized beams that emerge from the spatial modulator and respectively form a first modulated beam and a second modulated beam, and wherein the two modulated beams then pass again through the same polarization splitter, by which they are superimposed on one and the same axis and with one and the same direction towards the projection objective and/or towards the light source as a function of their modulation by the spatial modulator of light.

BRIEF DESCRIPTION OF THE DRAWINGS

The invention will be understood more clearly and other advantages shall emerge from the following description, given as a non-restrictive example and made with reference to the appended drawings, of which.

DETAILED DESCRIPTION OF THE INVENTION

Figure 1A:
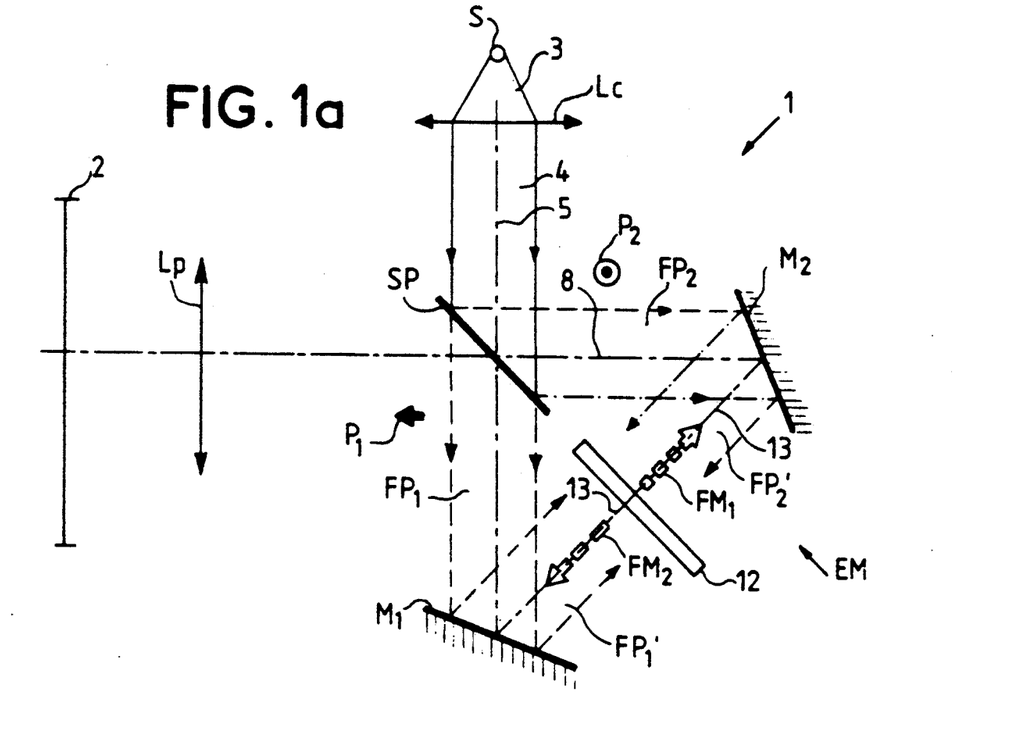
FIGS. 1a and 1b give a schematic view of the arrangement and working of an image projector according to the invention.

FIG. 1a gives a schematic view, by way of a non-restrictive example, of an image projector 1 according to the invention.

The image projector 1 has a light source S producing a light 3 that has no particular state of polarization. The light 3 is designed to be modulated spatially by a spatial modulator 12 of light, belonging to a light modulator set EM, with a view to forming an image projected on a projection screen 2 by means of a projection objective LP. The projection objective may possibly include a set of lenses. It enables the spatial modulator 12 of light and the projection screen 2 to be conjugated optically. The light 3 is picked up by a collimator lens LC that delivers a light beam 4 having parallel rays which get propagated along a first optical axis 5. The light beam 4 gets propagated towards the modulation set EM. The modulation set EM has a polarization splitting surface SP.

The light beam 4 is incident to the polarization splitting surface SP, and this surface produces a first polarized beam and a second polarized beam, FP1, FP2, that form an angle of 90° with each other.

The first polarized beam FP1 is a transmitted beam which, when it has gone through the splitting surface SP, gets propagated along the first optical axis 5 towards a first mirror M1.

The light that constitutes this first polarized beam FP1 has a first direction of polarization P1 parallel to the plane of incidence (the plane of incidence being the plane defined by the incident ray and the normal to the splitting surface SP).

The second polarized beam FP2 is a beam reflected by the splitting surface SP along a second optical axis 8 forming an angle of 90° with the first axis 5, and getting propagated towards a second mirror M2. The direction of polarization P2 of the second polarized beam FP1 is orthogonal to that of the first polarized beam FP1, i.e. it is perpendicular to the plane of incidence.

According to one characteristic of the invention, the two polarized beams FP1, FP2 are superimposed in space with opposite directions of propagation, in order to be spatially modulated simultaneously by the same spatial modulator 12 of light.

To this end, the planes of the mirrors M1, M2 are oriented so as reflect, respectively, the first and second primary beams FP1, FP2 on one and the same third optical axis 13.

Thus, the first and the second polarized beams FP1, FP2, respectively incident on the first and second mirrors M1, M2, constitute first and second reflected, polarized beams FP1', FP2', both having, as their axis, the third optical axis 13. The first reflected polarized beam FP1' gets propagated towards the second mirror M2 and the second reflected polarized beam FP2' gets propagated in the opposite direction towards a first mirror M1.

Furthermore, the spatial light modulator 12 is itself located on the third optical axis 13.

The spatial light modulator 12 is constituted, for example, by an LCD screen which is itself a standard device, having a plurality of elementary liquid crystal cells (not shown) forming a matrix array. The LCD screen 12 is controlled, for example in a standard way (not shown) by video signals.

The LCD screen 12 is positioned on the third optical axis 13 so that each ray of one of the beams FP1', FP2' having one of the polarizations P1, P2, is modulated by a same elementary liquid crystal cell as a ray of the other beam that has the other polarization and that originally belonged to a same elementary section of the wavefront of light produced by the light source 2. In the non-restrictive example described, the mirrors M1, M2 are positioned symmetrically with respect to the polarization splitting surface S and the LCD screen 12 is positioned in a same plane as this splitting surface S.

As the orientation of the mirrors M1, M2 has enabled the superimposition of the first and second polarized beams FP1', FP2', these beams both pass through the LCD screen 12 or spatial modulator 12 whence they emerge with opposite directions and respectively constitute a first modulated beam and a second modulated beam, FM1, FM2.

The first and second modulated beams FM1, FM2 are symbolized as follows: the modulated beam FM1 by a succession of squares and the second modulated beam FM2 by a succession of rectangles. So as not to reduce the clarity of FIG. 1a, the rest of the explanation on the working of the projector of the invention is given with reference to FIG. 1b.

Figure 1B:
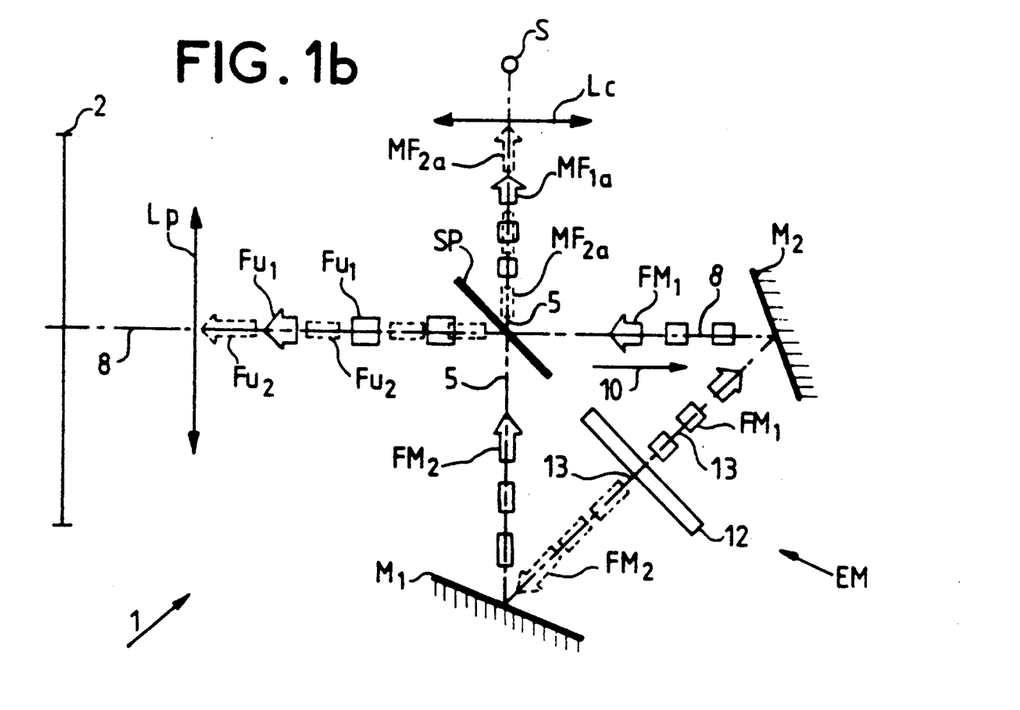

FIG. 1b shows the image projector of the invention with the same elements as in FIG. 1, positioned in the same way and on the same axes.

In emerging from the spatial modulator 12, the first and second modulated beams FM1, FM2 get propagated along the third optical axis 13, respectively towards the second mirror M2 and towards the first mirror M1. They are reflected by these mirrors M1, M2 in such a way that they are both incident on the polarization splitting surface SP, at the same point that had separated the first and second polarized beams FP1, FP2 (shown in FIG. 1a).

There are two main possibilities:

First possibility: the modulated beams FM1, FM2 have passed in the LCD screen 12 through cells that are "at rest", namely non-activated. In this case, for each beam, the direction of polarization has undergone a rotation of 90° when crossing the cell: hence, the modulated beam FM1 is of the type having the second direction of polarization P2, and the second modulated beam FM2 is of the type having the first direction of polarization P1.

Given its direction of polarization, the first modulated beam FM1 is reflected by the splitting surface SP and constitutes a beam MF1A that is not useful to the image and gets propagated along the first optical axis 5 towards the light source.

The second modulated beam FM2, having the first direction of polarization P1, goes through the splitting surface SP and constitutes a beam MF2A which itself also gets propagated towards the light source S and is superimposed on the modulated beam FM1a. Thus, in the first case, these two beams emerge (from the splitting surface SP) superimposed and directed towards the light source S.

Second possibility: the modulated beams FM1, FM2 have passed in the LCD screen 12, in going through one or more activated cells. In this case, the liquid crystal has lost its rotational power with respect to the rays that pass through this elementary image dot, and each direction of polarization is preserved, i.e. in this case, the first and second modulated beams FM1, FM2 respectively include the first and second polarization directions P1, P2. As a consequence, firstly the first modulated beam FM1 goes through the splitting surface SP without being deflected. It constitutes a first useful beam FU1 that gets propagated towards the projection objective LP, along the second axis 8 on which the second mirror M2, the polarization splitting surface SP, the projection objective LP and the projection screen 2 are centered. Secondly, the second modulated beam FM2 is reflected by the splitting surface SP. It constitutes a second useful beam FU2 which itself also gets propagated along the second optical axis 8 towards the projection objective LP. Thus, in the second case, the two useful beams FU1 and FU2 emerge (from the splitting surface SP) superimposed and directed towards the use represented by the projection objective LP, i.e. directed by 90° with respect to the previous case.

Under these conditions, it is seen that, to a resting elementary image dot of the LCD screen 12, or in other words to a resting liquid crystal cell of this screen 12, there will correspond a black dot on the projection screen 2, while an activated elementary dot will correspond to a white dot. If there is an elementary image dot in the intermediate state between the rotational capacities of 0° and 90°, then a gray level will be obtained that will be all the darker as the rotational capacity is great.

A positive image is thus projected on the screen formed by the two useful beams FU1, FU2, i.e. by means of the two complementary components of polarization, while the non-useful beams MF1a, MF2a form a negative image and are sent back towards the light source S1. The energy from the two beams MF1a and MF2a get added to that of the light source S, and it is used again to illuminate the spatial modulator 12.

Figure 2:
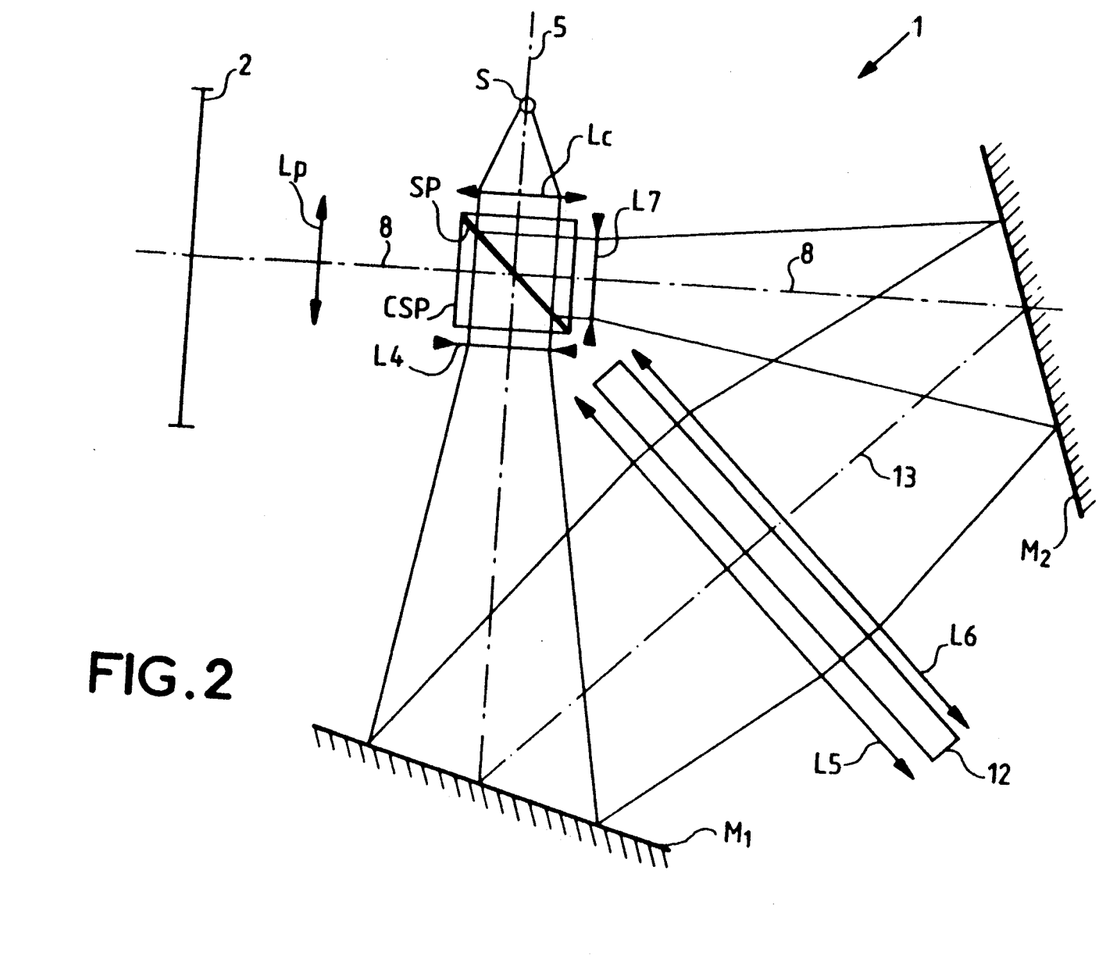
FIG. 2 shows the invention with the addition of an afocal optical system.

The different elements cited with reference to FIGS. 1 and 2 are standard per se. According to one characteristic of the invention, the polarization splitting surface SP is made by a stacking of films in thin layers of dielectric materials so as to obtain an alternation of different refraction indices, in a manner that is standard per se.

In a model used for validation, the splitting surface SP is constituted by means of a polarization splitting cube having a stack of thin films as mentioned above. This splitter cube is of a type commonly available in the market. For example it is of the 38 mm cube type, marketed by the firm MELLES GRIOT, under the reference 03 PBS 049. The spatial light modulator is an LCD screen with an active matrix (with TFTs) formed by 250,000 liquid crystal cells having dimensions of 600 mm×600 mm.

In the light modulation set EM of the invention, the optical paths define a triangular shape. A first side is formed between the polarization splitting surface SP and the first mirror M1. A second side is formed between splitting surface SP and the second mirror M2. The third side is formed between the two mirrors M1, M2 between which the LCD screen 12 is positioned. In this triangular structure, with the LCD screen 12 being positioned in a same plane as the splitting surface SP, the optical paths between this surface SP and the LCD screen 12 have a same length in passing through the first mirror M1 or else through the second mirror M2. To this length of optical path, we must add the distance between the projection objective LP and the splitting surface SP, to obtain the distance of the optical path between the projection objective LP and the LCD screen 12 or spatial modulator screen 12.

It is known that, in any image projection system, this optical path distance between the projection objective and the spatial modulator screen should be as small as possible, in order to reduce the aperture of the projection objective to the minimum. It is noted however that, in the modulation set EM, for a given LCD screen dimension 12 and for a given dimension of splitting surface, its triangular structure dictates a minimum optical path to be kept between the projection objective and the LCD screen 12.

FIG. 2 shows the arrangement of the invention using the afocal optical system, notably with a view to diminishing the bulk and cost of the devices used to form the polarization splitting surface SP, especially when this surface has a wide spectral passband and when it is desired to use a wide surface LCD screen.

This figure shows a relative arrangement of the elements that is the same as the one already shown in FIGS. 1a and 1b.

In the version of the invention shown in FIG. 2, the LCD screen 12 has dimensions far greater than those of the splitting surface SP which is formed in a polarization splitting cube CSP. To this end, as shown in FIG. 2, the image projector 1 further has: an additional divergent lens 14 located in the vicinity of the splitting surface SP; an additional convergent lens L5 located in the vicinity of the LCD screen 12, between this screen and the first mirror M1; a second additional convergent lens L6, located in the vicinity of the LCD screen 12 between this screen 12 and the second mirror M2; a second divergent lens L7 located in the vicinity of the polarization splitting surface SP between this surface SP and the second mirror M2. It is thus possible, as shown in FIG. 2, to make the beams divergent before they reach the LCD screen 12 or optical valve, and then to make them convergent for their return towards the splitting surface SP.

The additional lenses L4, L5, L6, L7 may be the so-called Fresnel lenses, or even holographic lenses bonded to the cube CSP and to the LCD screen 12.

If the source S has an angular dimension that is not zero when seen from the cube CSP, then the divergent lenses L4 and L7 may be omitted. The lenses L5 and L6 then act as field lenses. The assembly L5–L6 forms an image of the condenser LC superimposed with LC itself and, symmetrically, an image of LC superimposed on the output pupil of the system, i.e. generally the location of the projection lens 12.

The above examples are given for linear polarizations, but the arrangement of the invention may be applied also to circular polarizations, for example by using a cholesteric type of liquid crystal cell, of the type working as a Bragg reflector for a given circular polarization and for a given wavelength of the incident beam.

Figure 3:
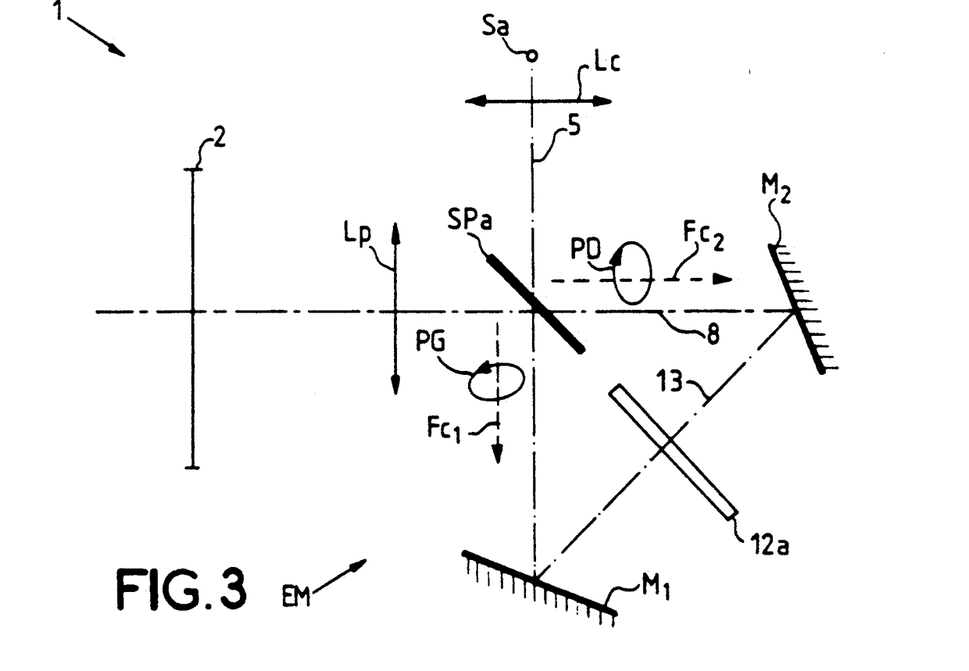
FIG. 3 gives a schematic view of the application of the invention to the case of circular polarizations of light.

FIG. 3 gives a schematic view, by way of a non-restrictive example, of an application of the invention to the case of circular polarizations.

The arrangement of the elements is similar to that of FIGS. 1 and 2 but, in this application, the polarization splitting surface SPa is formed by a cholesteric type of liquid crystal cell. It is constituted in a manner that is standard per se, for example by means of two glass plates between which the liquid crystal is contained.

The light gets propagated along the first optical axis 5 towards the polarization splitting surface SPa which, in the non-restrictive example described, firstly transmits a polarized beam FC1 (symbolized by an arrow drawn with dashes) comprising the left-hand circular polarization PG. Secondly, the polarization splitting surface SPa reflects a polarized beam FC2 having the right-hand circular polarization PD. These two beams having the complementary polarizations are then reflected by the first and second mirrors M1, M2 and they both illuminate the spatial light modulator 12a. This modulator 12a is an LCD screen, the cells of which may be designed (in a manner that is conventional per se, notably with respect to the thickness and the refraction indices) so that, when at rest, they invert the direction of each circular polarization, for a wavelength corresponding to that for which the splitting surface SPa acts. By contrast, when the cells of the LCD screen 12a are activated, the birefringence disappears and the direction of rotation is preserved.

Then, the superimposition of beams towards the projection objective LP and/or towards the source Sa follows the same rules as in the case of linear polarizations.

Figure 4:
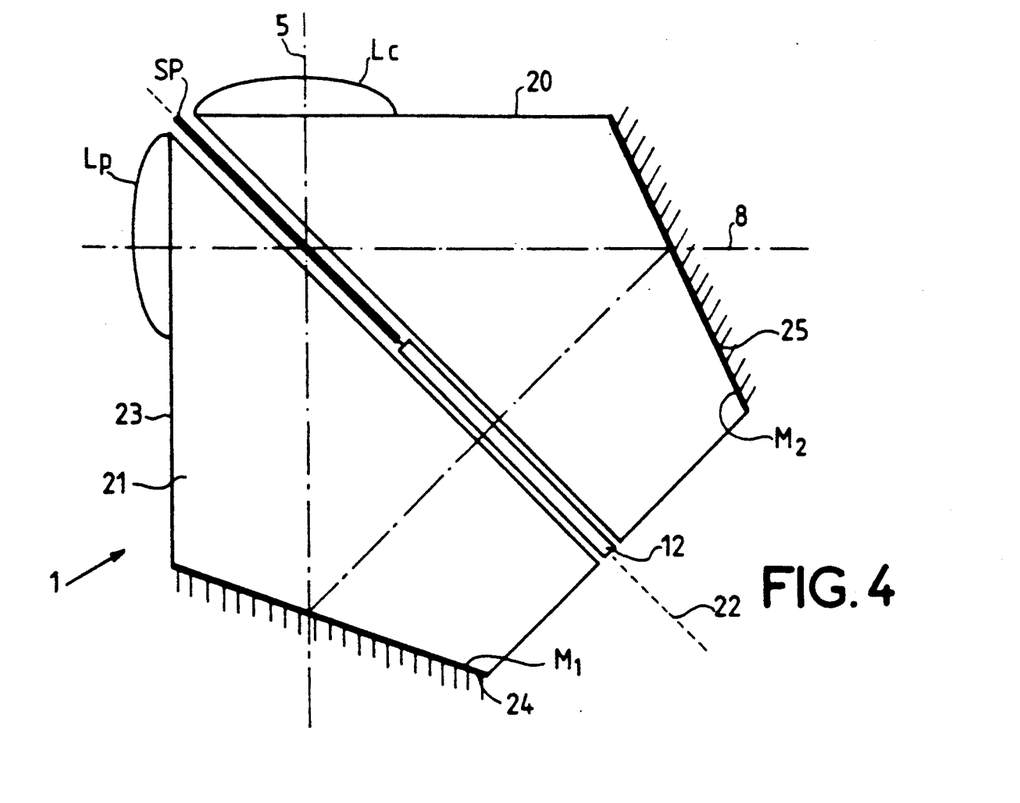
FIG. 4 gives a schematic view of a compact structure of a modulation set according to the invention.

FIG. 4 gives a schematic view, by way of a non-restrictive example, of a compact structure that is compatible with imperatives of industrial-scale production. This structure contains the elements referred to in the above examples with the exception, naturally, of the light source and projection screen.

The projection device 1 has two symmetrical blocks 20, 21 made of a transparent material (for example glass or molded plastic) positioned so as to face each other. Between these symmetrical blocks, there are interposed, firstly, the dielectric thin layers that form the polarization splitting surface SP and, secondly, the LCD screen 12.

Each glass block 20, 21 has a lens on one of its faces 23: the first block 20 bears the collimator lens LC and the second block 21 bears the projection lens LP. The assembly formed by the two blocks 20 21 includes, firstly, opposite the collimator lens LC, a first inclined face 25 (formed on the second block 21) metallized so as to constitute the first mirror M1. Secondly, opposite the projection lens LP, it includes a second inclined face 25 (formed on the first block 20) metallized so as to constitute the second mirror M2. This arrangement enables the constitution of the first and second optical axes 5, 8. These two axes intersect at the splitting surface SP which, with the LCD screen 12, is located in an overall plane of symmetry 22 (symbolized by a line of dashes). The third optical axis 13 is perpendicular to said plane of symmetry as in the above examples.

One of the advantages of such an arrangement is that, if the two transparent glass blocks 20, 21 are strictly identical, then the relative positioning of these two parts provides the adjustment needed for the superimposition of the beams. It further provides the advantage of high reproducibility and high thermal stability.

The light modulation unit of the invention, enabling the two complementary polarization beams to be superimposed as described with reference to FIGS. 1 to 5, is directly compatible with applications involving monochromatic images, but it is compatible also with other known methods used to project color images.

In one of these methods, the spatial light modulator 12 is provided with a filter colored red, green or blue for each elementary image dot: a group of three consecutive elementary dots or pixels possesses all three colors. The encoding of the video signal provides for the relative proportioning of these three colors in each group of three pixels. In this case, it is possible to use a white light source, and a cube CSP of the wideband type for the splitting of the complementary polarizations. The drawback of this approach is that it divides the resolution of the image by three, as compared with monochromatic operation.

Another known method of forming a color image consists in the use of three optical valves, i.e. three LCD screens instead of only one, and in the superimposition of the images projected. Each of the three LCD screens is illuminated by only one of the primary colors, blue, red and green. It is advantageous to have only one optical system of projection on the projection screen, notably in order to enable the enlargement of the image to be varied easily.

In this spirit, it is proposed to position several modulation sets according to the invention, each associated for example with a light source, each source having a different color, to arrive at a highly compact color projector. This is obtained by making profitable use of the triangular structure displayed by the optical paths in a light modulation set EM according to the invention, in order to group together two, three or more modulation sets of the invention, and to give them common axes as can be seen in FIG. 5 while, at the same time, keeping the distance in optical path between the projection lens and the LCD screens as small as possible.

Figure 5:
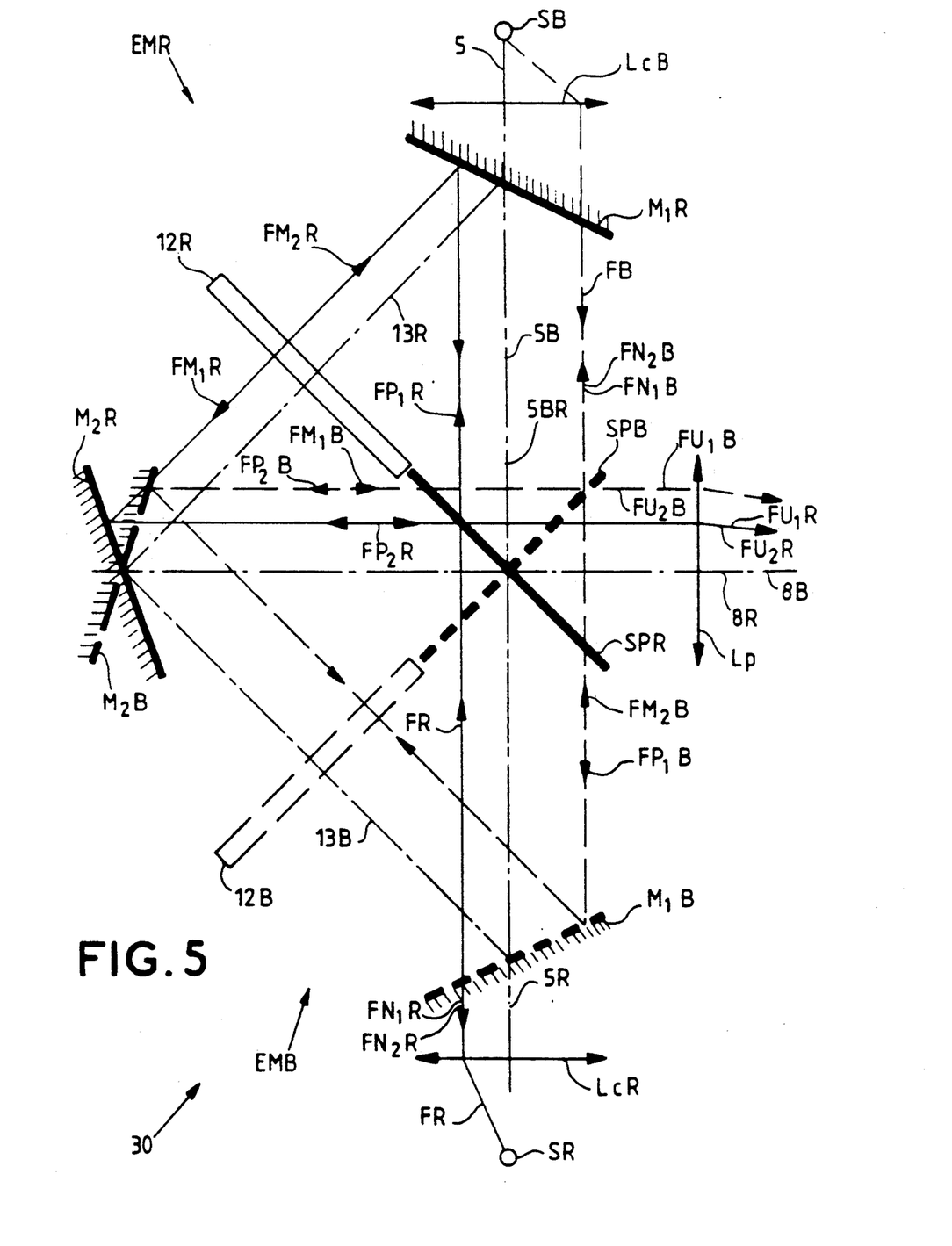
FIG. 5 shows a schematic view of an image projector using several modulation sets according to the invention.

FIG. 5 gives a schematic view of a color projector 30 having at least two light modulation sets EMB, EMR according to the invention. These light modulation sets EMB, EMR are imbricated so as to have two common axes. Each modulation set is associated with a light source SB, SR. The two sources produce a differently colored light, for example blue for the first source SB associated with the first modulation set EMB and red for the second source SR associated with the second modulation set EM Each modulation set is similar to the one shown in FIGS. 1a, 1b and its elements have the same references followed by the letter B or R depending on whether they belong to the set assigned the blue light or the one assigned the red light.

The blue light produced by the blue source SB goes through a collimation lens LCB which turns it into a beam FB that gets propagated along the first axis 5B towards a polarization splitting surface SPB. This surface SPB generates a first polarized beam and a second polarized beam, FP1B and FP2B (colored blue) which get propagated respectively on the first optical axis 5B and on the second optical axis designed to form a projection axis 8 (these two axes form an angle of 90°), respectively towards the first and second mirrors M1B, M2B. These two beams are reflected by the mirrors M1B, M2B and then get propagated along one and the same third optical axis 13B (forming an angle of 45° with the axes 5 and 8) with opposite directions, so as to illuminate the LCD screen 12B with two blue-colored orthogonal and complementary polarizations, the LCD screen 12B being positioned on the third optical axis 13B. Having crossed the LCD screen 12B, these beams are modulated by this screen and constitute modulated beams FM1B, FM2B. These modulated beams are reflected by the mirrors M2B, M1B towards the splitting surface SPB, whence they emerge as already shown in FIG. 1b, either as useful, blue-colored superimposed beams FU1B, FU2B (shown in FIG. 5 by a single arrow) which get propagated towards the projection lens LP, or as superimposed, non-useful or negative imaging beams (FN1B, FN2B shown by a single arrow) which get propagated towards the source of blue light SB.

This summarizes the operation, already explained above for the modulation set EM shown in FIGS. 1a, 1b, and may be applied also to the operation of the second modulator set EMR assigned to the color red.

It must be noted that the first and second optical axes 5, 8 (the latter forms the projection axis 8) are common to the two modulation sets EMB and EMR and that, consequently, the two light sources SB and SR are on one and the same optical axis 5BR, opposite one another in relation to the projection axis 8. Consequently, the optical diagram concerning the beams formed out of the red light produced by the source SR is symmetrical with the one described for the blue light, with respect to the projection axis 8. It is therefore possible to find two red-colored superimposed beams, having complementary orthogonal polarizations P1, P2 propagated in a same direction, either as beams FU1R, FU2R going towards the projection lens LP, or as negative beams FN1R, FNR2 going towards the red light source SR.

This arrangement results notably in the advantage wherein the projection objective LP optically conjugates both the LCD screen 12B (blue light) with the projection screen 2 and this screen 2 with the LCD screen 12R (red light).

However, owing to their common axes, each of the two modulation sets EMB and EMR thus imbricated has surfaces that have to be inoperative for the light beams having the color assigned to the other set.

Indeed, at the intersection of the projection axis 8 with the first optical axis 5 BR (common to the blue and to the red), there are both the polarization splitting surface SPB for the blue color and the splitting surface SPR for the red color, the planes of which form a 90° angle with each other. Thus, according to one characteristic of the invention, if the beams of a given color are to go through the splitting surface assigned to the other color practically without loss and without any modification of direction, the splitting surfaces SPB and SPR are each made to act selectively, i.e. to act only for the light having the color to which they correspond. The splitting surfaces SPB and SPR may be constituted for this purpose by a stack of thin dielectric layers (not shown) deposited on a glass surface, in a manner that is standard per se for constituting filters or prisms or selective mirrors acting a given range of wavelengths. Again, with respect to these mirrors: the mirrors M1B, M2B, designed to reflect the blue light, should let through the red beams practically without loss, and this is also the case for the mirrors M1R, M2R which should reflect the red beams and let through the blue beams. Consequently, the mirrors M1B, M2B and M1R, M2R, to be reflectors solely for the color to which they correspond may themselves also be made by a stack of thin dielectric layers deposited on a glass surface.

The color projector of the invention may include at least one additional light modulator set, assigned to the third primary color, green for example. This third set for the color green is not shown in FIG. 5 but it has its second optical axis, namely the projection axis 8, in common with the two sets, namely the blue set and the red set, EMB, EMR. In fact, the three sets are deduced from one another by rotation about this axis of projection, by an angle of 90° for example (or any angle whatsoever such that the three LCD screens do not touch one another). Thus, the third set for the color green may be positioned in such a way that, with its projection axis being indistinguishable from the projection axis 8, its first optical axis (the axis bearing the light source, the collimator lens, the splitting surface and the first mirror) would be perpendicular to the plane of FIG. 1.

It is seen that, in the color projector 30, the modulation sets EMB, EMR are assembled in such a way that the projection objective LP is common to all the sets irrespectively of their number, and that the optical path distances between the projection objective LP and the different LCD screens 12B, 12R are equal.

Another advantage of the color projector 30 is that, as compared with the monochromatic projector comprising a single LCD screen as described in FIG. 1, the minimum distance D given by the triangular structure is preserved between the projection objective and each LCD screen. It is seen that there is also the possibility, in the structure with several LCD screens, of introducing field lenses as described with reference to FIG. 2.

Figure 6:
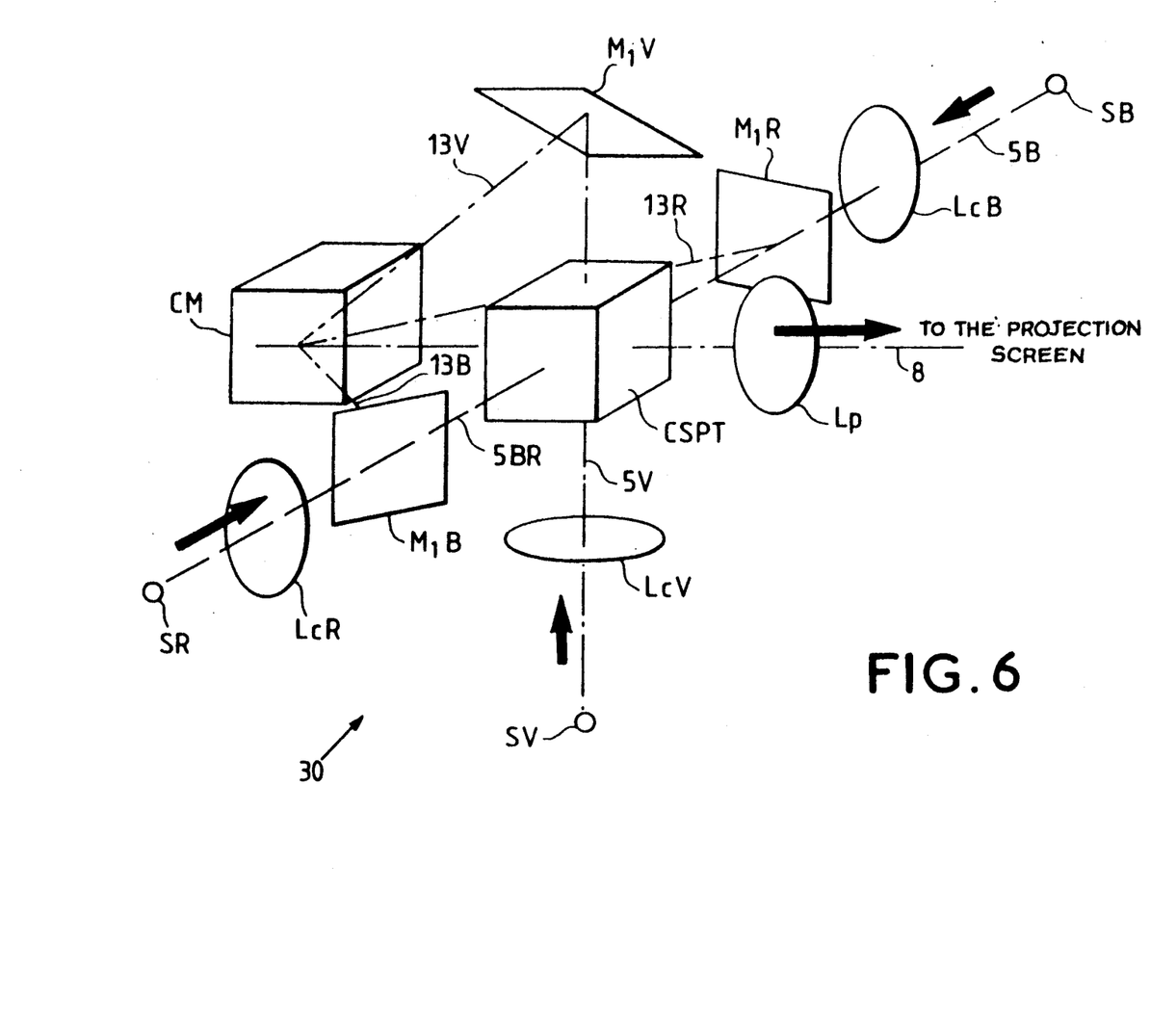
FIG. 6 shows a view that enables the 3D localization of the respective positions of the elements shown in FIG. 5.

FIG. 6 shows a view in perspective enabling a clearer identification of the positioning of the elements of a color projector 30 of the type shown in FIG. 5, comprising three modulation sets, each assigned to a different color, for example, blue, red and green, B, R, V respectively.

The color projector 30 has a projection axis 8 common to all three colors, formed by the three second optical axes 8B, 8R, 8V. It has three splitting surfaces SPB, SPR, SPV (not shown in the figure) of a type that is selective in wavelengths and, according to one characteristic of the invention, these three splitting surfaces are all contained in a same triple polarization splitting cube CSPT. It further has three reflecting surfaces, of a type that is selective in wavelengths, each forming a second mirror M2B, M2R, M2V. According to a characteristic of the invention, these three second mirrors are contained in a same mirror cube CM. A blue light source SB and a red light source SR are positioned on a same first optical axis 5BR, opposite each other with respect to the projection axis 8. The triple polarization splitting cube CSPT is located at equal distance from the two sources SB, SR at the intersection of the projection axis 8 with the first optical axis 5BR. The mirror cube CM is positioned on the projection axis 8 opposite the projection lens LP in relation to the first optical axis 5BR.

In following the first optical axis 5BR and going from the blue source SB towards the red source SR, the following elements are found in succession:
- the collimator lens LCB for the blue light;
- the first mirror M1R for the red light;
- the triple splitting cube CSPT;
- the first mirror M1B for the blue light;
- the collimation lens LCR for the red light;
- the red light source SR.

The mirror cube CM and the first mirror M1B for the blue light are on the third optical axis 13B where only blue light beams get propagated in different directions, and on which the spatial light modulator or LCD screen 12B (not shown) should be located. As in the above examples, each color has its LCD screen 12 positioned on the third optical axis 13B, 13R, 13V of the corresponding modulation set. However, for the greater clarity of the FIG. 5, the LCD screens or optical valves are not shown. It must be specified that these LCD screens 12 are in a plane perpendicular to the third optical axis 13 which bears them and are in a same plane (not shown) as the one which contains the corresponding splitting surface SP (contained in the cube CSPT).

The mirror cube CM and the first mirror M1R for the red light are on the third optical axis 13R.

The green light source SV is located on its first axis 5V, which is perpendicular both to the first optical axis 5BR (red and blue) and to the projection axis 8, and passes through the intersection of these two axes.

A collimation lens LCV for the green light is located on the optical axis SV, between the green source SV and the triple splitting cube CSPT. A first mirror M1V for the green light is located on the first optical axis 5V of green light, and this mirror determines, with the mirror cube CM, a third optical axis 13V for the green light.

In the multicolor projector version shown in FIGS. 5 and 6, the light sources SB, SR and SV are monochromatic. They are either primary sources, namely sources that produce the light themselves, or secondary sources and, in the latter case, the light may be a white light produced by a single, white primary source associated with an element that enables the separation of the three primary colors, red, green and blue. A structure such as this is standard per se. Indeed, color-separation cubes (or prisms) known as dichroic cubes are commonly available in the market and it is enough to transmit each colored beam (by means of optical fibers for example) up to the point at which the sources SB, SR, SV of a corresponding color (shown in FIGS. 5, 6) are located.

In a color projector structure such as the one shown in FIGS. 5 and 6, firstly the polarization splitting surfaces SPB, SPR, SPV and the surfaces that form the mirrors M1B, M2B, M1R, M2R, M1V, M2V should act selectively. Secondly, the polarization splitting surfaces SPB, SPR, SPV, on the one hand, and the second mirrors M2B, M2R, M2V, on the other hand, should be imbricated, in intersecting planes.

Figure 7A:
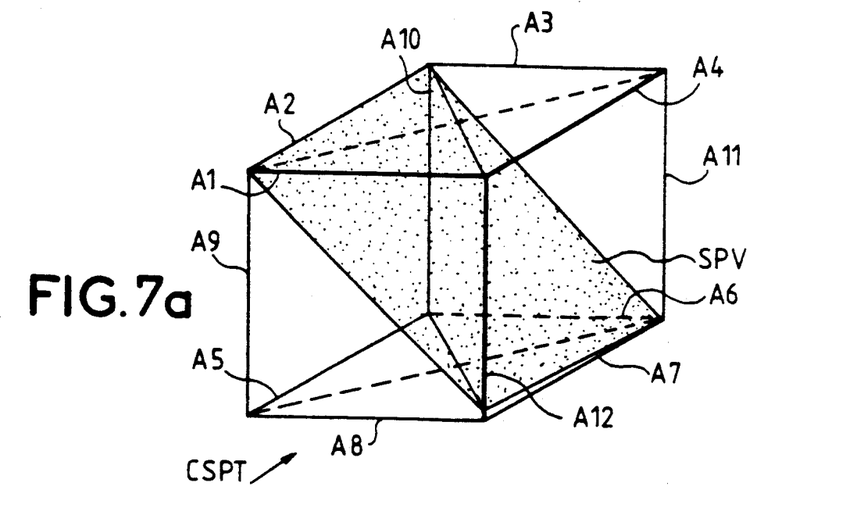
FIGS. 7a and 7b show views in perspective of the splitting surfaces of polarization contained in a cube shown in FIG. 6.
Figures 7B, 7C:
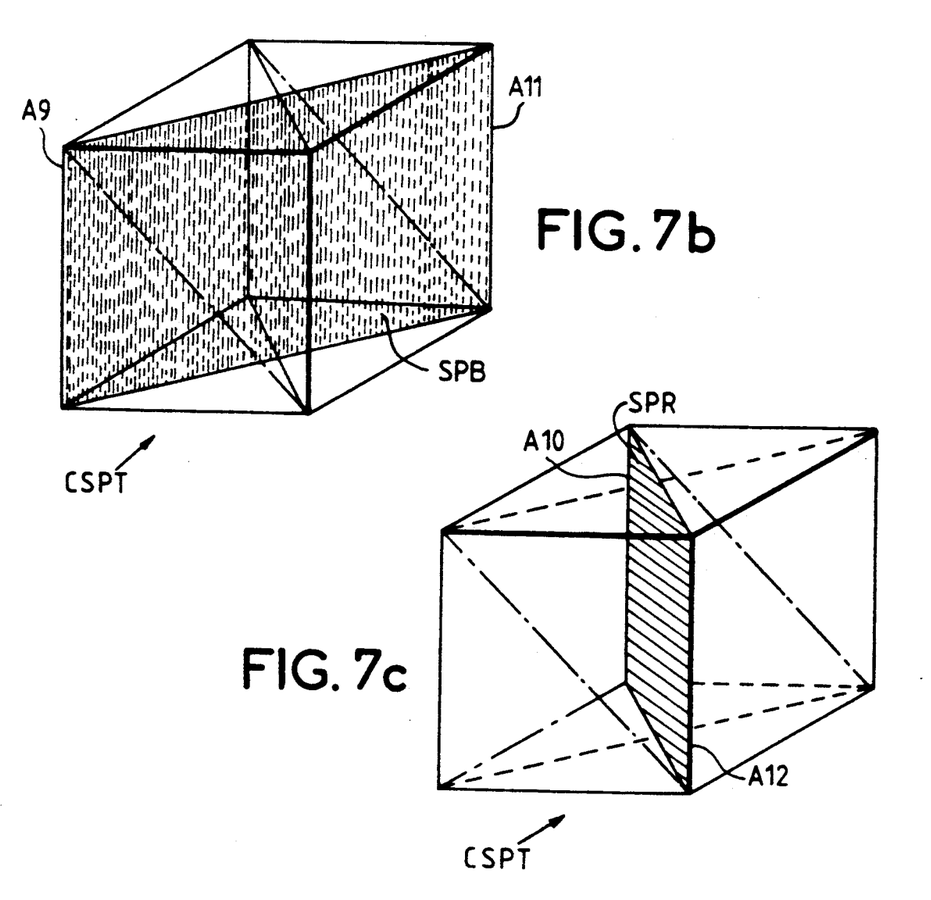

FIGS. 7a, 7b, 7c are views in perspective that illustrate the imbrication of these surfaces in taking, for example, a case where the polarization splitting surfaces SPB, SPR, SPV, are contained in a same cube CSPT.

FIG. 7a shows the cube CSPT, the 12 edges of which are referenced A1 to A12. One of the three polarization splitting surfaces, for example the splitting surface SPV assigned to the color green, is formed in the plane containing the two opposite edges A2 and A7.

FIG. 7b shows the cube CSPT and, more particularly, it shows another polarization splitting surface formed in the plane containing the two opposite edges A9 and A11. Referring to the example of FIG. 6, if the splitting surface of FIG. 7a is the surface SPV, the surface shown in FIG. 7b is the splitting surface SPB assigned to the blue light.

FIG. 7c shows the cube CSPT and represents the splitting surface SPR assigned to the red. This splitting surface is formed in a plane containing the two opposite edges A10 and A12.

FIGS. 7a to 7c show that the splitting surfaces intersect one another and the example of these figures may be applied also to the case of the selective reflecting surfaces which should constitute the second mirrors M2B, M2R and M2V in the version shown in FIGS. 5 and 6.

The making of imbricated surfaces such as these may give rise to problems in the context of industrial-scale manufacturing, especially if it is attempted to make these surfaces in a transparent cube, notably in order to avoid the usual problems of variations in refraction indices.

If it is sought to make these surfaces in a transparent cube, either to form a cube CM containing the three surfaces forming the second mirrors M2B, M2R, M2V, or to form the triple splitting cube CSPT, then such cubes may be constituted by an assembly of elementary parts that are transparent to light, made of glass or plastic for example.

Figures 8A, 8B, 8C:
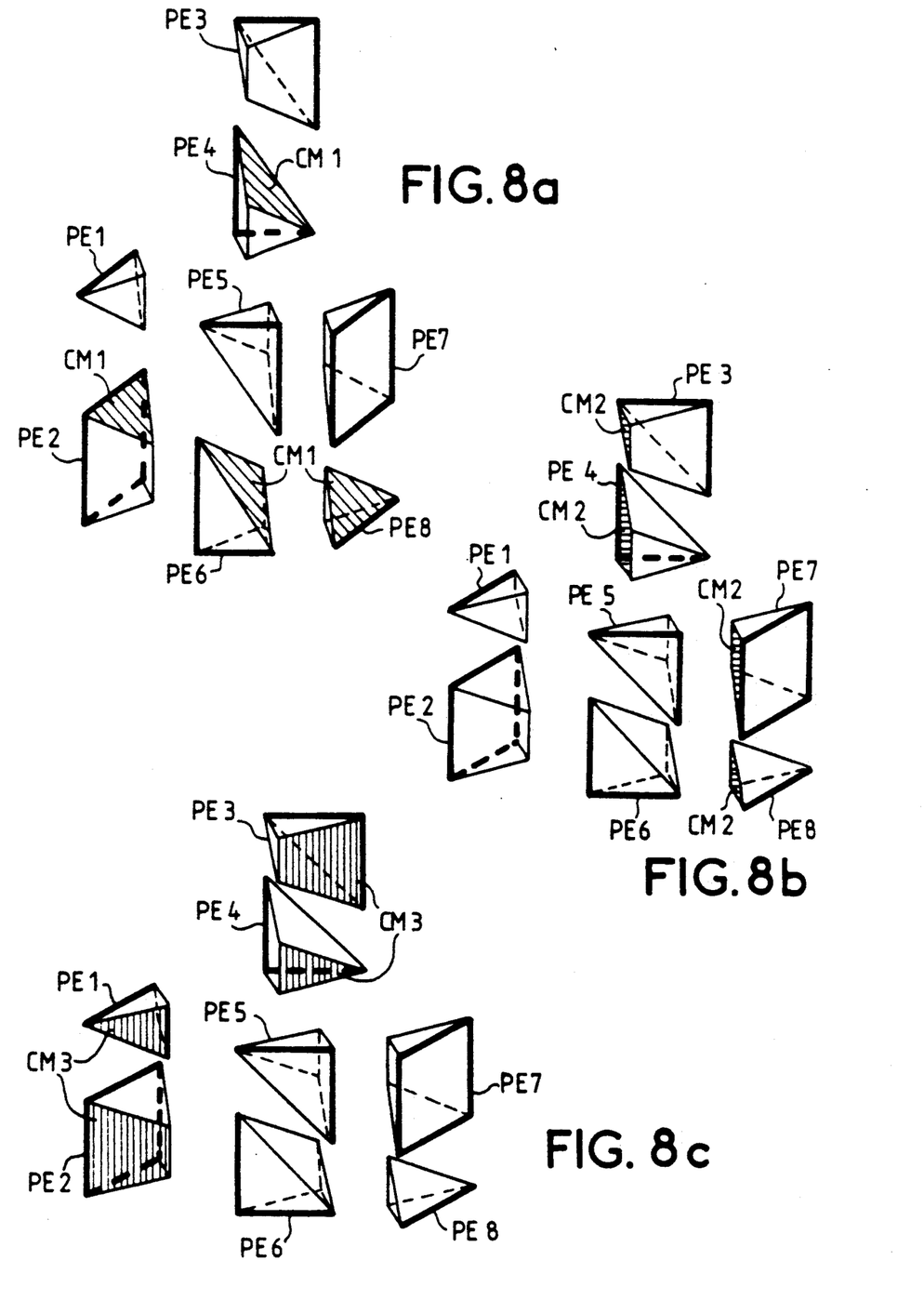
FIGS. 8a to 8c show views in perspective of the elementary pyramids forming a cube of the FIGS. 7a, 7b, 7c.

FIGS. 8a, 8b, 8c show a same set of such elementary parts PE1 to PE8, the assembling of which leads to the obtaining of a cube such as the cube CSPT, shown in FIGS. 7a to 7c, which can contain three polarization splitting surfaces. But it must be understood that the example described with reference to FIGS. 8a to 8c can be applied also to the making of a cube CM containing three selective mirrors.

The elementary parts PE1 to PE8 have a pyramidal shape and have one or two of their faces treated, i.e. covered with stacks of thin layers. These elementary parts from a cube when they are joined together.

The pyramidal parts PE1 to PE8 correspond to parts that would be obtained by cutting the cube, along the three planes each containing a splitting surface SPV, SPB, SPR shown in FIGS. 7a, 7b, 7c. The eight elementary parts PE1 to PE8 are then obtained. It is seen that parts are identical in sets of two: the first and eighth parts PE1, PE8; the second and seventh parts PE2, PE7; the fourth and fifth parts PE4, PE5; the third and sixth parts PE3, PE6. Naturally, pyramidal parts having shapes different from those of the parts PE1 to PE8, shown in FIGS. 8a to 8c, may also be obtained by cutting a cube along only two planes, each containing either a splitting surface SPR, SPB, or a second mirror M2R, M2B, according to the example shown in FIG. 5.

FIGS. 8a and 8c use hatched lines to show cases of treatment or stacking of thin dielectric layers made on one or two faces of some of the elementary parts, with a view to forming mirrors or polarization splitters that act selectively.

Thus, FIG. 8a uses inclined hatched lines to illustrate a first type of stacking of thin dielectric layers CM1 (acting for example for the green light) made on one face of the elementary parts PE2, PE4, PE6 and PE8.

FIG. 8b uses horizontal hatched lines to show a second stack of thin dielectric layers CM2 (acting, for example, for the red light) made on one face of the four parts PE3, PE4, PE7 and PE8.

FIG. 8c uses vertical hatched lines to show a third type of stack CM3 of thin dielectric layers (acting for the blue light) made on one face of the four parts PE1, PE2, PE3 and PE4.

It is possible to obtain a maximum of six bisector surfaces in a cube. Such surface imbrications, having selective properties, can be made through the use of the technology of thin dielectric layers for example.

As for the second mirrors (M2) imbricated with one another, they may be obtained by the same technique as for the cube with three polarization splitting surfaces (i.e. by the joining of elementary pyramids) in using the same technology for the deposition of thin layers of dielectric materials, the difference being that the functions obtained (mirror functions) are selective in wavelengths and insensitive to the polarizations.

Figure 9:
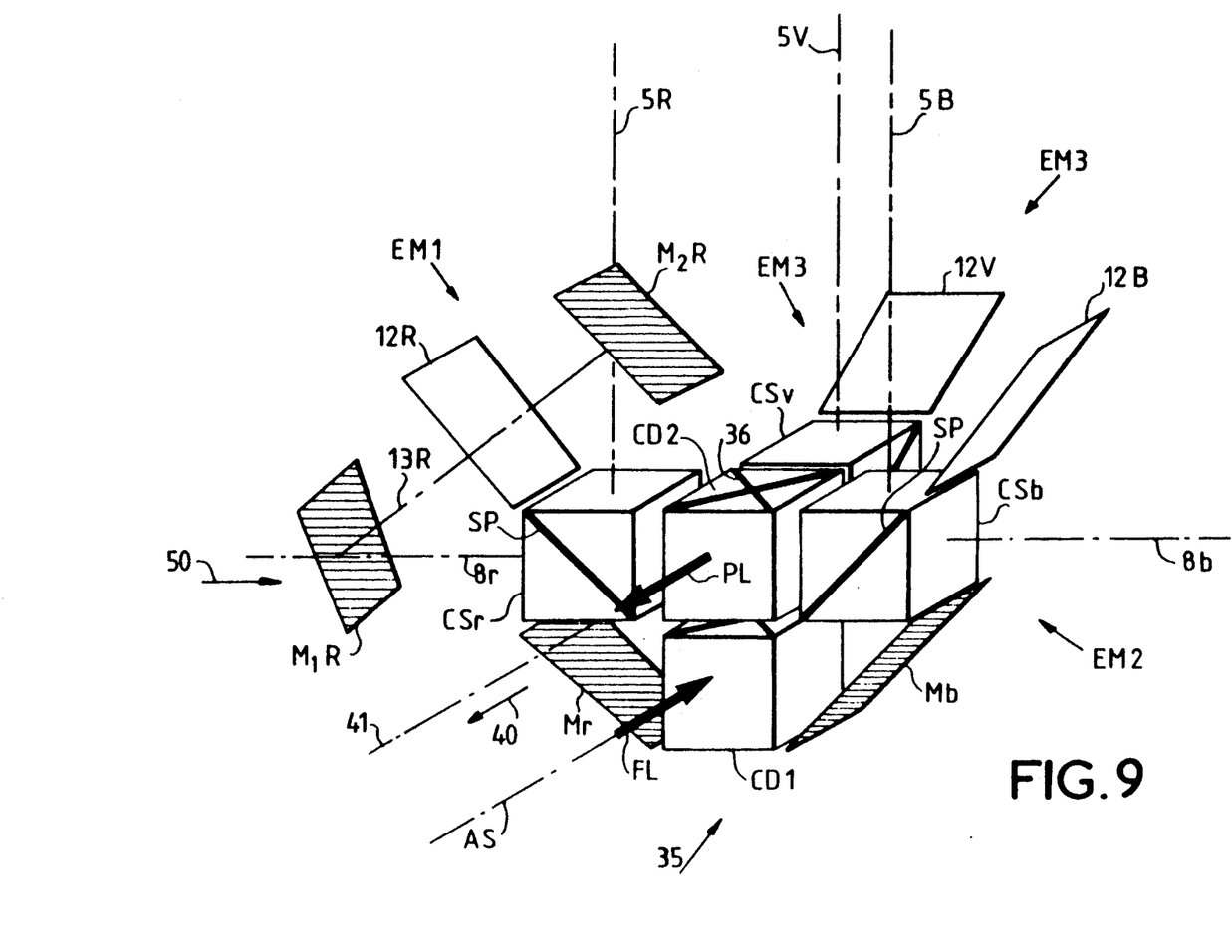
FIG. 9 shows a view in perspective illustrating the respective positions of three modulation sets of the invention, positioned around two dichroic cubes to form an image projector.

FIG. 9 is a view in perspective showing a partial view of a color projector 35 with three sets of modulations EM1, EM2, EM3 like the one shown in FIG. 1, in a version in which each modulation set is crossed by light beams of only one color. It is therefore not necessary, in this version, to make the different polarization splitting surfaces and the different mirrors selective in wavelengths.

The color projector has a light source SLB (not shown in FIG. 9) located on a source axis AS, producing a white light beam FL. The white light beam FL penetrates along the source axis AS into a first dichroic tube CD1 fulfilling the color separation function. The first dichroic cube CD1 separates the three components of different colors: the green is transmitted along the source axis AS towards an illumination mirror Mv (not shown in FIG. 2) designed to reflect this green light along a first optical axis 5V for green light; the red is reflected towards the left of the figure towards an illumination mirror Mr designed to reflect the red light along a first optical axis 5R for red light; the blue light is reflected rightwards, towards an illumination mirror Mb, designed to reflect this blue light along a first optical axis 5B for blue light.

Each of the optical axes 5V, 5R, 5B constitutes a first optical axis of a modulation set, such as the first optical axis 5 of the set EM shown in FIG. 1. In fact, the illumination mirrors Mr, Mb, Mv correspond to and replace, respectively, the red light source SR, the blue light source SB and the green light source SV mentioned in FIGS. 5 and 6. Consequently, from each illumination mirror Mr, Mb, Mv, the optical scheme is known and it corresponds, for each color, to the one already explained with reference to FIG. 1 and FIGS. 5 and 6, to constitute a modulation set.

For the red light, for example, it is reflected by the illumination mirror Mr, along the first optical axis 5R, towards a polarization splitting surface SP formed by a polarization splitting surface CSr. As in the above examples, this splitting surface SP is designed to generate two polarized beams (not shown) having complementary directions of polarization: one of the beams is transmitted along the first optical axis 5R towards the first mirror M1R. The other beam is reflected along a second axis 8R towards the second mirror M2R. The mirrors M1R, M2R are inclined so as to reflect the beams on a third optical axis 13R, on which the optical valve or LCD screen 12R is placed. The LCD screen 12R is located in the same plane as the splitting surface SP.

As in the above examples, the beams get propagated in opposite directions to go through the LCD screen 12R by which they are modulated. These beams are then reflected by the mirrors M2R, M1R towards the splitting surface SP of the cube CSr, whence they emerge superimposed with a same direction, and get propagated towards the light source and/or towards the projection screen (not shown) in a quantity that varies with the degree of activation of the elementary cells (not shown) of the LCD screen 12R.

In the version shown in FIG. 5, the red rays, which return to the light source, get propagated towards the illumination mirror Mr by which they are reflected towards the first dichroic cube or color separating cube CD1. They are reflected by this cube CD1 along the source axis AS towards the light source SLB, i.e. in the direction opposite to that of the white light beam FL.

The rays that should form the image to be projected, namely the positive imaging rays, get propagated along the second optical axis 8R, from the splitting surface SP towards a second dichroic cube CD2 which fulfills the reverse function to the one fulfilled by the first color separating cube CD1. In fact, these two cubes CD1, CD2 are identical and oriented in one and the same way, the difference being that the second cube CD2 is located on a same axis as the different polarization splitting surfaces SP and notably on the axis 8R on which the splitting surface SP, assigned to the color red, is located. Thus, for the red light coming from the beam splitting cube CSr, this second dichroic cube CD2 has a reflecting surface 36 for the red, oriented so as to reflect this light in a direction 40 along a new projection axis 41 forming an angle of 90° with the axis 8R, the direction 40 being contrary to the white light beam FL. In fact, this second cube CD2 superimposes the different colored beams, red, green and blue with which they constitute a single polychromatic light beam FP.

The modulation set EM1 that has just been described is assigned to the red light, and the color projector 35 has a second modulation set and third modulation set EM2, EM3, assigned respectively to the blue light and to the green light.

The second modulation set EM2 has a polarization splitting cube CSb containing a splitting surface SP. This surface SP receives the blue light coming from the illumination mirror Mb, which reflects this light along the first optical axis 5B. The working of the second modulation set EM2 is the same as for the first one, and therefore does not have to be explained again. This is why the first and second mirrors, M1B, M2B, located on either side of the LCD screen 12B, are not shown, for the greater clarity of the figure. The blue light coming from the polarization splitting cube CSb (located at the intersection between the first optical axis 5B and the second optical axis 8B) after modulation by the LCD screen 12B, may be either reflected by the illumination mirror Mb to return towards the light source SBL (in a manner similar to that described for the red light) or reflected towards the second dichroic cube CD2, to be reflected by this cube CD2 on the new projection axis 41 in the direction 40 of the projection lens LP (not shown in FIG. 9) as in the case of the red light.

Finally, the third modulation set EM3, designed to process the green light, includes a polarization splitting cube CSv positioned at the intersection between the first optical axis 5V and that of the second axis 8V which is merged with the new optical axis 41. For the greater clarity of the figure, the first and second mirrors M1V, M2V of this modulation set are not shown, but the working of this modulation set is the same as for the other sets: after having been modulated by an LCD screen 12V, the light coming from the polarization splitting surface gets propagated towards the second dichroic cube CD2. This cube CD2 is transparent to the green light, so that this green light emerges from said second dichroic cube CD2 along the new projection axis 41 towards the projection objective and gets superimposed on the red and blue lights.

Figure 10:
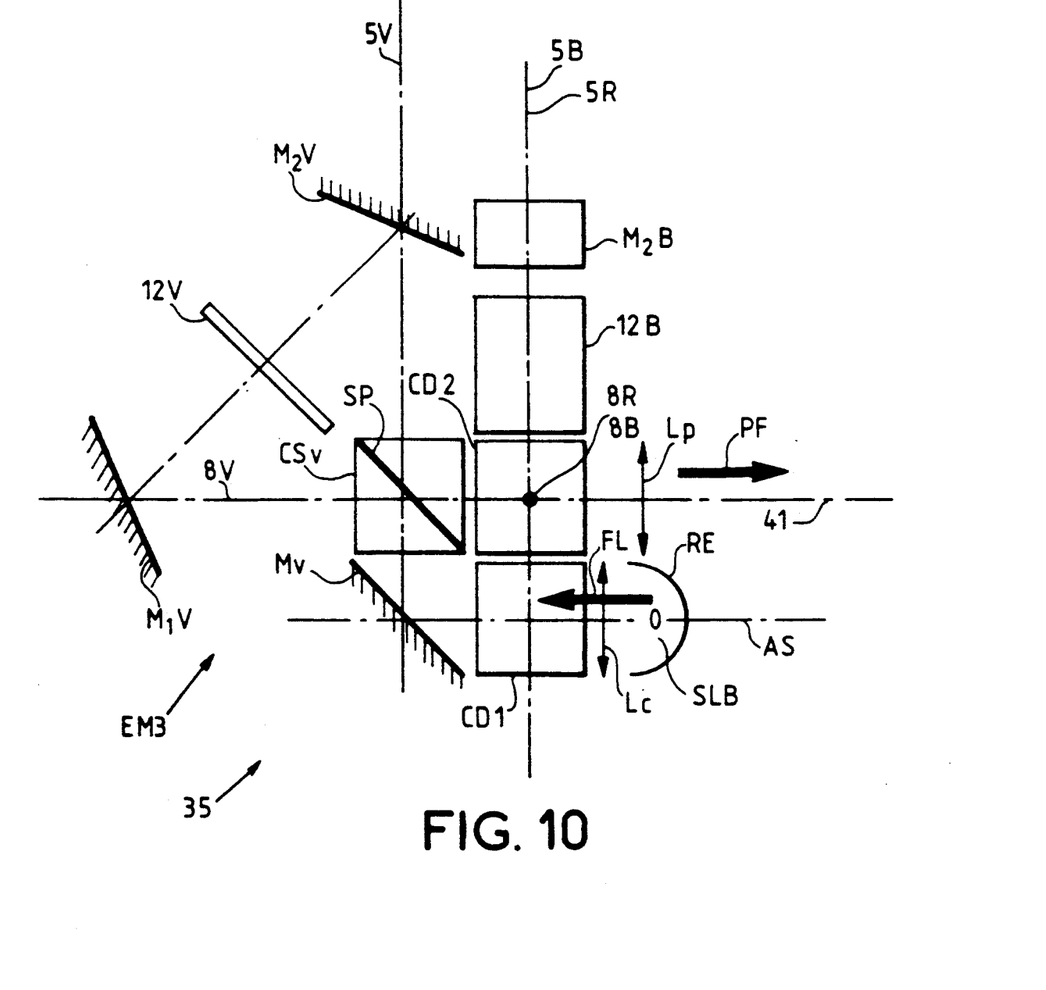
FIG. 10 shows a view of the projector of FIG. 9, seen from the side, along an arrow 50 shown in FIG. 9.

FIG. 10 shows the color projector 30 by its side, as seen along an arrow shown in FIG. 9, in assuming that the illumination mirror Mr for the red and the entire first modulation set EM1 have been removed.

FIG. 10 can be used to better locate the elements that have been referred to but not shown in FIG. 9.

This figure shows the first and second dichroic cubes CD1, CD2, positioned respectively on the source axis AS and on the new projection axis 41, these two axes being parallel to each other. The white light beam FL is delivered by the light source SLB which is placed at the center of curvature of a reflector RE. A collimation lens LC is interposed between the source and the first dichroic cube D1. An illumination mirror Mv, designed to reflect a green light towards the third modulation set EM3, is positioned at the intersection of the first optical axis 5V with the source axis AS. The third modulation set EM3 includes: the polarization splitting cube CSv containing the splitting surface SP and the first and second mirrors M1V, M2V on the third optical axis 13V on either side of the LCD screen 12V. The first mirror M1V is at the intersection between the third optical axis 13V and the axis 8V, and the second mirror M2V is at the intersection between the first and third optical axes 5V and 13V. The polarization splitting cube CSv is at the intersection between the first optical axis 5V and the second axis 8V, the latter being the same as the new projection axis 41.

The LCD screen 12B and the second mirror M2B which are assigned to the color blue and belong to the second modulation set EM2 are seen above the second dichroic cube CD2.

The first optical axes 5R and 5B, belonging to the first and second modulation sets, are seen to be indistinguishable from each other in one and the same plane, and their second optical axes 8R and 8B are indistinguishable from each other and are perpendicular to the plane of the figure, and are seen in this figure as a dot.

Opposite the polarization splitting cube CSv, there is the projection lens LP on the new projection axis 41. The polychromatic light beam FP goes through the lens LP to get propagated towards the projection screen (not shown).

The color projector 35 shown in FIGS. 9 and 10, as well as the one shown in FIG. 6, has the advantage, as compared with prior art devices, notably of being capable of having identical optical paths for all three primary colors and of having a projection lens common to all three colors while at the same time preserving, for each color, the advantage of luminous efficiency given by a modulation set EM1, EM2, EM2, ME3 according to the invention.

Figure 11:
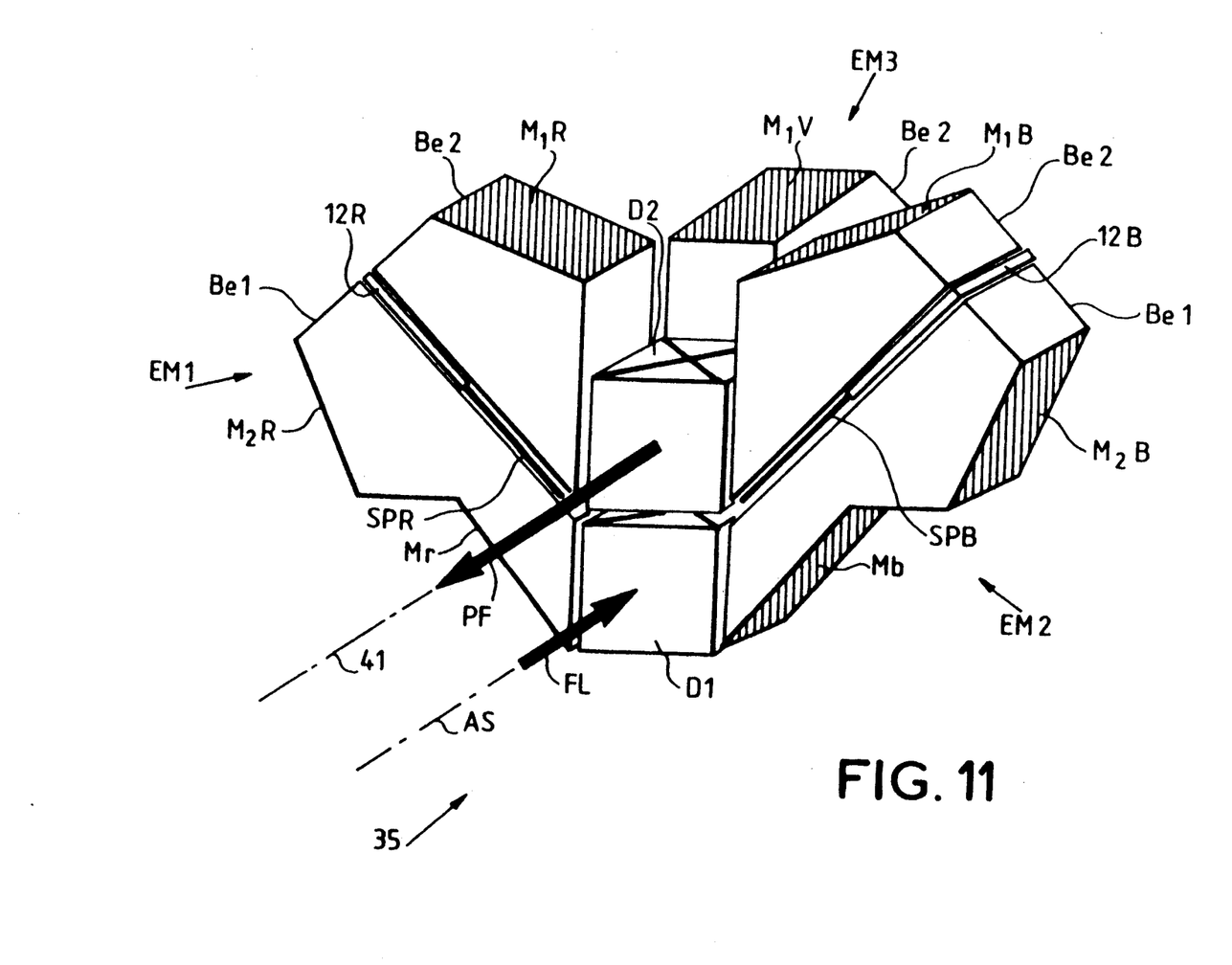
FIG. 11 illustrates an embodiment, as made on an industrial scale, of the image projector shown in FIGS. 9 and 10.

FIG. 11 is a view in perspective giving a view, by way of a non-restrictive example, of an industrial type of embodiment of the color projector 35 shown in FIGS. 9 and 10.

The modulation sets EM1, EM2, EM3 are each constituted by two elementary transparent blocks Be1, Be2, made of glass, for example, or of molded plastic. The modulation sets are positioned around two dichroic blocks D1, D2, which are superimposed.

For each modulation set EM1 to EM3: a block Be1 bears the illumination mirror Mr, Mb, Mv and the second mirror M2R, M2B and M2V (M2B alone being visible in FIG. 11): the second block Be2 bears the first mirror M1R, M1B, M1V; the polarization splitting surface SP and the optical valve, namely the LCD screen 12R, 12B, 12V (12V cannot be seen), are interposed between the two elementary transparent blocks Be1, Be2.

The reflecting surfaces of the mirrors are made by metallization of external faces of the blocks Be1, Be2. The polarization splitting surfaces SP may be constituted by a stack of thin dielectric layers on a glass surface.

Apart from the dichroic cubes D1, D2, the reflecting and polarization splitting treatment may be, according to choice, wideband treatment (in the entire visible spectrum) or else treatment optimized for the corresponding color.

This device using two dichroic cubes makes it possible to achieve a compact and industrially feasible solution without requiring the imbrication of polarization splitting surfaces, this being achieved at the cost of only one additional mirror per light modulator, the so-called illumination mirror.

What is claimed is:

1. An image projector comprising:
   at least one light source,
   at least two light modulation sets,
   at least one projection objective,
   wherein each light modulation set comprises a spatial light modulator, a polarization splitter that splits the light into a first polarized beam and a second polarized beam propagating along different directions and having different and complementary polarizations,
   wherein each light modulation set comprises means to superimpose the first and second polarized beams on one and the same optical axis with opposite directions of propagation, the spatial light modulator is positioned on said optical axis in order to modulate the first and second polarized beams that pass through the spatial modulator and respectively form a first modulated beam and a second modulated beam having complementary polarizations,
   wherein the two modulated beams pass again through the same polarization splitter, by which they are superimposed on one another and have the same propagation direction along at least one axis, and propagate towards at least one of the projection objective and the light source, wherein relative intensities of the superimposed and modulated beams propagating respectively towards the projection objective and the light source are a function of modulation by the spatial light modulator of the first and second polarized beams, wherein the polarization splitters are selective in wavelength and form imbricated and intersecting surfaces.

2. An image projector according to claim 1 wherein the polarization splitters are of the type formed by a stacking of dielectric thin layers.

3. An image projector according to claim 1 wherein, in each modulation set, the polarization splitter and the spatial light modulator are located in one and the same plane.

4. An image according to claim 1, wherein each modulation set includes a first mirror and a second mirror located on one and the same optical axis as the spatial light modulator and on either side of said spatial light modulator, each mirror reflecting, firstly, towards the spatial modulator, a polarized beam having a given direction of polarization and, secondly, towards the polarization splitter, a modulated beam having a direction of polarization complementary to that of the first one.

5. An image projector according to claim 4 wherein, in each modulation set, the polarization splitter and the two mirrors define an optical path that is common to the beams of the two complementary polarizations.

6. An image projector according to claim 5, wherein the optical path has a triangular shape and the two mirrors and the polarization splitter are aligned so that the beams pass again through the polarization splitter to be superimposed on at least one of a path of light from the polarizer to the light source and a path of light from the polarizer to the projection objective.

7. A projector according to claim 1 wherein, in each modulation set, the polarization splitter has an area that is substantially smaller than that of the spatial modulator.

8. A projector according to claim 1, wherein the polarization splitter is of the type that acts for the linear polarizations.

9. A projector according to claim 1, comprising at least three modulation sets, each assigned to the processing of a different color and having at least a path of light which impinges upon the projection objective in common.

10. A projector according to claim 9, wherein the first and second modulation sets have a second axis in common, said second axis being along a path between first mirrors of each of the first and second modulation sets.

11. A projector according to claim 10, wherein the three modulation sets each have a polarization splitter, a first mirror and a second mirror, and wherein the three polarization splitters, the three first mirrors and the three second mirrors are selective in wavelengths.

12. A projector according to claim 11, wherein each of the three polarization splitters has a splitting surface, wherein the polarization splitters are of the type formed by a stack of thin dielectric layers and wherein the splitting surfaces are imbricated with one another.

13. A projector according to claim 12, wherein the three polarization splitters are formed in one and the same transparent cube which is itself constituted by a joining of elementary pyramids, similar to parts that would be obtained by cutting up the transparent cube along the different planes, each corresponding to a splitting surface.

14. A projector according to claim 13, wherein each polarization splitting surface is formed by partial surfaces, each constituted on one face of an elementary pyramid, a face on which there is made a stack of dielectric thin layers that is active for a given wavelength.

15. A projector according to claim 11, the three second mirrors being each of the type formed by a stack of thin dielectric layers, wherein the second mirrors are imbricated with one another.

16. A projector according to claim 15, wherein the second mirrors are formed in one and the same transparent cube which is itself constituted by a joining of elementary pyramids, similar to parts that would be obtained by cutting up the transparent cube along the different planes, each corresponding to a splitting surface.

17. A projector according to claim 16, wherein each second mirror is formed by partial surfaces, each constituted on one face of an elementary pyramid, a face on which there is made a stack of dielectric thin layers that is active for a given wavelength.

18. A projector according to claim 1, comprising at least three modulation sets, each assigned to a different color, a single source of light delivering a beam of white light, a first dichroic cube separating the white light into three different colors, each light of a given color being reflected towards the polarization splitter of the corresponding modulation set, and wherein a second dichroic cube superimposes the light coming from each of the modulation sets in order to constitute a beam of polychromatic light getting propagated towards the projection, objective.

19. A projector according to claim 18, wherein the modulation sets are each constituted by two transparent blocks separated by a plane containing a polarization splitter and a spatial modulator, and wherein the two dichroic cubes are superimposed and surrounded, on three faces, by the three modulation sets, each modulation set including an illumination mirror located so as to be facing a face of the first cube.

* * * * *